Feb. 17, 1959 R. C. GLAZIER ET AL 2,874,318
COIL WINDING METHOD AND APPARATUS
Filed Jan. 4, 1954 3 Sheets-Sheet 1
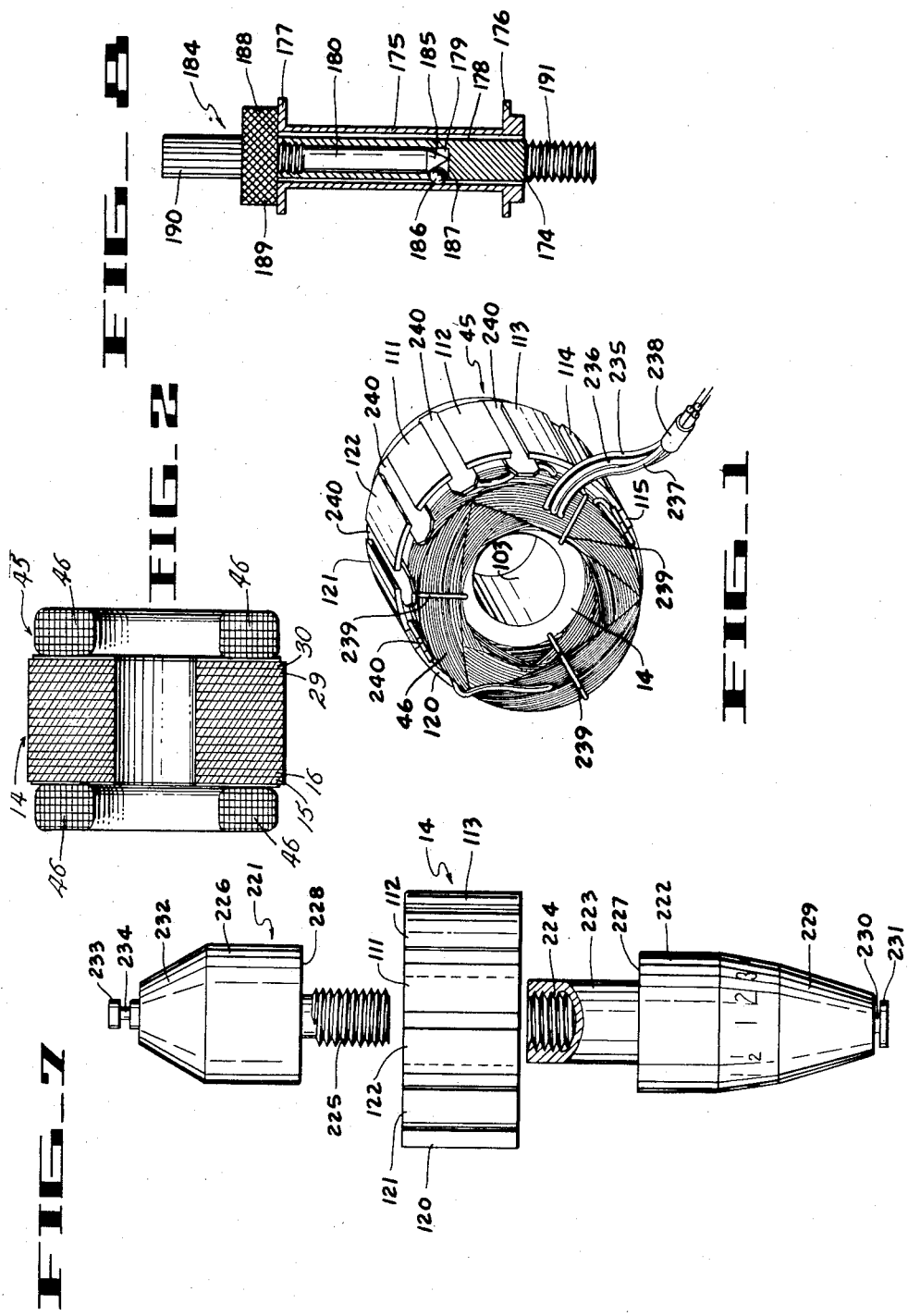

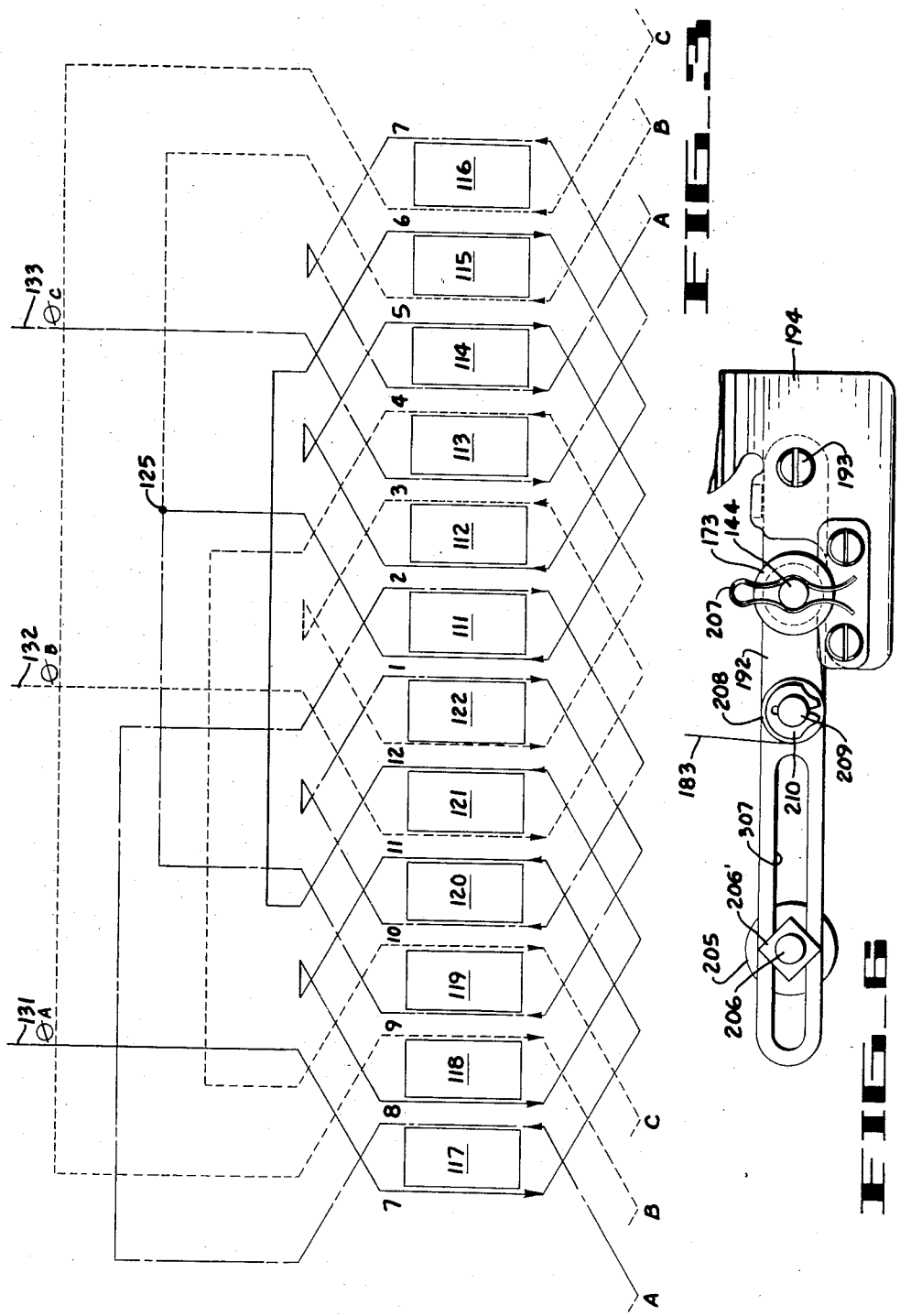

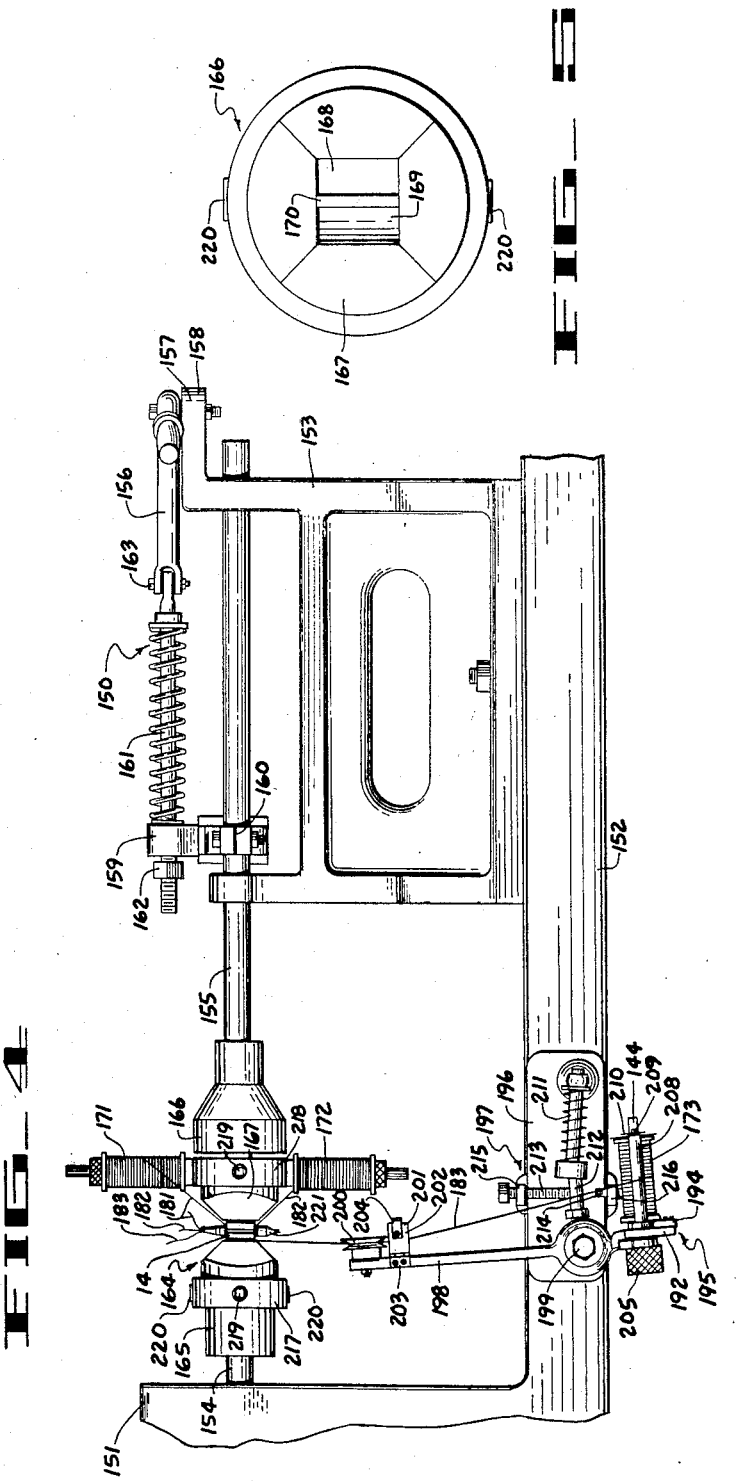

United States Patent Office

2,874,318
Patented Feb. 17, 1959

2,874,318

COIL WINDING METHOD AND APPARATUS

Robert Charles Glazier, Hayward, and Gottfried Zickler, Castro Valley, Calif., assignors to Friden, Inc., a corporation of California Application January 4, 1954, Serial No. 401,784

3 Claims. (Cl. 310—260)

This invention relates to a coil winding method, and apparatus therefor, and more particularly to a coil winding structure in which a plurality of coils are applied on a support to provide a plurality of energizing coils for an electrical apparatus.

An object of the invention is to provide an improved electrical coil.

Another object of the invention is to provide an electrically balanced stator comprising a plurality of phase windings of substantially equal resistance.

Another object of the invention is to provide an improved method and means for winding a plurality of energizing coils on a supporting member in which the coils are wound on the supporting member in a plurality of divided operations, the operation of winding one coil being accomplished in a plurality of stages interposed with stages of winding another of the coils.

Another object of the invention is to provide an improved coil winding machine.

Another object of the invention is to provide an improved wire guiding spindle.

Another object of the invention is to provide an improved wire holding bobbin.

A divisional application S. N. 592,021 was filed June 18, 1956, in the names of the inventors herein indicated to cover the method of making the coil and the apparatus for forming the coil.

In the drawings:

Fig. 1 is a view in perspective of a completely wound stator member made in accordance with the invention.

Fig. 2 is a view in cross-section of the wound stator shown in Fig. 1.

Fig. 3 shows a wiring diagram of the stator made in accordance with this invention and in effect shows the segments of the stator rolled out in a flat plane.

Fig. 4 is a front elevational view of portions of a winding machine with a stator member supported therein and partly wound in accordance with this invention.

Fig. 5 is an end view of one portion of a two part chuck member provided in the winding machine.

Fig. 6 is a side view of a wire tensioning and guiding arm member forming part of the winding machine.

Fig. 7 shows a stator core member ready to be wound and a two-part spindle operable to extend through the stator member.

Fig. 8 is a side view partly in cross-section of a two part bobbin used in supplying wire to the stator.

In the manufacture of wire wound members such for example as the stators of gyroscopes, Selsyns and other motor members, and in which a plurality of phase windings are applied to a core, it is common practice to wind each section of each phase winding from a separate length of wire and to connect the various portions of each phase winding by means of solder or other approved wire connecting means and methods. The connections made by means of solder or other physical means may or may not form good electrical connections of the parts and may in some cases introduce electrical resistance characteristics of an unbalancing and unsatisfactory nature and not tolerable in the structure required.

In the present invention, a plurality of phase windings are applied and interposed in successive operations while maintaining each phase winding as an unbroken length of wire.

The windings 46 comprise a plurality of windings of wire and form a plurality of phase windings for the stator. Each phase winding is a single unbroken length of insulated wire and is wound on the stator in a plurality of stages which are interposed with the stages of the other phase windings. For example, as shown in Fig. 3, there are three phase windings applied to this stator, the phase windings being identified as A, B, and C respectively and one end of each of the windings terminates in a star connection 125 in which the three windings are electrically connected. The other end of each winding forms an outer end of the energizing system of the stator and comprises the outer ends 131, 132 and 133 representing respectively the windings A, B, and C.

*Method of winding*

It will be seen by looking at Fig. 3 that the first phase winding A extends from the outer end through the slot #7 in the stator 14 and proceeds through the slot 11 into the slot 8, from slot 8 to 12 and then through slots 6 to 2 to 5 and 1 to the star connection 125.

The second phase winding B can be traced from the outer end 132 through slots 11, 3, 12, 4 and 10 to C, picking up again at C on the right-hand end of the drawing through slots 6 to 9 to B, picking up again at terminal B on the right-hand part of the drawing through slot 5 to the star connection 125.

The third phase winding C may be traced from its outer end 133 through slots 3, 7, 4, to A, picking up again at A on the left-hand side of the drawing and proceeding through 8, 2, 10, 1, 9 and to the star connection 125. The points A, B and C on the left and right-hand parts of the drawing are not indications of a break in the phase windings but are illustrated in the manner shown because the drawing is an illustration of the stator 14 in effect being rolled out in a single plane. It will be understood therefore that there is no break from the points 131, 132, 133 of the three phase windings to the star connection 125 which represents the inner ends of the windings at which point they are all connected together. The outer ends 131, 132 and 133 are maintained as outer terminals for the attachment thereto of lead-in wires from the required sources of current supply. In actual practice the windings shown as single lines in the drawing Fig. 3 are many turns of the winding wire, and the lines in Fig. 3 are only representative of the direction taken by the plurality of phase windings provided in the stator.

For example, as shown in Fig. 1 it will be seen that the energizing windings 46 comprise many strands of wire extending across various portions of ends of the stator to energize predetermined groups of the pole pieces 111 to 122 inclusive as required. In an actual stator from which Fig. 1 was drawn each stage of winding comprised 170 turns of wire extending from one predetermined slot to another before the direction of winding was changed and after 170 turns of one of the phase windings had been made from one predetermined slot in the stator to another a like number of turns of the next phase winding was made before the first phase winding operations were continued into the second stage. This pattern of winding is maintained throughout the winding of the stator until the required amount of energizing winding applications is obtained. The number of turns applied in winding the stator and the number of pole pieces embraced during each stage of the winding will depend on the particular electrical characteristics desired in the stator. The present invention is not limited to the number of phase windings applied or the number of turns applied in each operation, but to the method and apparatus and structure in which the phase windings are applied to the stator core without requiring the severing and reattachment of wires in the plurality of phase windings which are maintained as unbroken lengths of wire from one end of a phase winding to the other end of the phase winding thus requiring no solder connections or mechanical connections of any kind which might produce undesirable resistance conditions and unbalance effects in the stator.

In the method of winding a three phase winding stator in accordance with the present invention, three spools of wire of the required gauge and electrical characteristics are prepared. The wire is fed from the spools separately onto the stator core 14 which is rotated in a suitable winding machine 150, shown in Fig. 4, and comprising a head stock 151, a base 152 and a tail stock 153. Supported in and extending from the head stock 151 is a motor driven rotatable shaft 154 which is in register with a longitudinally movable shaft 155 extending from and supported in the tail stock 153, the shaft 155 being movable longitudinally by means of a lever system 156 pivotally supported at a point 157 on an extension piece 158 forming part of the tail stock 153. The manually operated lever system is mechanically attached to the shaft 155 by means of a clamp structure 159 part of which is clamped at the point 160 to the shaft 155 and the other end is adjustably secured to a screw threaded rod 161 which extends through the clamp 159 and is provided with an adjustment nut 162, the other end being pivotally attached by a bolt means 163 to the lever system 156. Cooperatively supported on the shafts 154 and 155 is a two-part chuck 164, one half portion 165 being secured to shaft 154, the other half portion 166 being secured to the shaft 155. The two parts of the chuck are movable relative to each other by operation of the lever system 156, to clamp a work piece between their work faces or to release the work piece from the machine 150, the work piece in the present invention being a stator core 14 shown in Figs. 1, 2, 4 and 7.

Fig. 5 shows one of the chuck parts to illustrate the work engaging face thereof, both halves of the chuck 164 having the same kind of work engaging faces, a tapered end portion 167 of the chuck half having formed therein recesses 168 and 169 separated by a projecting rib 170. The recesses 168 and 169 are cooperatively suitable to accommodate the pole faces on the stator core and the rib 170 being operable to extend into the slots between the pole faces of the stator core. When the stator core 14 is clamped between the parts 165 and 166 of the two-part chuck 164 as shown in Fig. 4, rotation of the shaft 154 will operate to cause rotation of the stator core 14 which is supported so that the pole pieces of the stator core 14 extend transversely of the axis of the shafts 154 and 155. Each phase winding is applied separately to the stator core 14 in operational steps alternated with the operational steps in applying the previous winding. That is to say a portion of the first phase winding is applied followed by the application of a portion of the second phase winding which is also followed by an application of a portion of the third phase winding. Another portion of the first phase winding is then applied followed by a portion of the second phase winding which is followed by a portion of the third phase winding until all sections required to be wound are applied. At predetermined points in the winding operation the chuck 164 is opened and the stator core 14 is rotated to bring into line with the path of feed of the wire other predetermined slots of the stator core 14 into which portions of the windings are to be laid.

Three spools of wire 171, 172 and 173, are required in winding a three phase winding stator of the type shown and described in this invention. Each spool of wire is used in turn in winding a portion of a phase winding on the stator core 14 as shown in Fig. 4, which in the particular instance shows the spool 173 as supplying wire 183 to the stator core 14 mounted in the winding machine 150. In this particular case the wire has already been supplied to the stator core 14 from the spool 171 for a portion of the first phase winding, the portion being built up of turns of wire 181 which have been supplied from the spool 171. Portions of the second phase winding have also been applied to the stator core 14 from the spool 172, the wire 182 being supplied therefrom to required portions of the stator core 14. The wire being instantly applied however, is the wire 183 coming from the spool 173 which is rotatably supported on a stem 144 which in this particular position takes the place of the stem 174 shown in Fig. 8 and used in the spools 171 and 172 and following the structure shown in Fig. 8. The stem 174 supports a spool 175 having flanges 176 and 177 the major portion of the spool 175 being supported on the body portion 178 of the stem 174. The body portion 178 is longitudinally bored for a portion of its length to provide a passageway 179 to accommodate the shank portion 180 of a screw threaded rod 184 which extends into the passageway 179 and has formed on its inner end a conical point 185 engageable with a ball bearing 186 which upon full entering of the stem 184 in the passageway 179 is thrust by the conical end portion 185 outwardly in a lateral opening 187 in the passageway 179, the ball bearing 186 being thrust laterally against the inner surface of the barrel portion of the spool 175 to hold the spool 175 against rotation on the stem 174. The stem 174 is provided with a knurled flange 188, internally threaded to receive the threaded portion of the rod 184. The male threaded end 191 of the stem 174 is mounted in the chuck 164.

As shown in Figs. 6 and 4 the stem 144 is supported in an apertured lever 192 pivotally supported on a screw 193 secured in the lower end 194 of a support 195 mounted on a plate 196 secured to the base 152 of the machine 150. The plate 196 has pivotally supported thereon a lever 198 which extends upwardly from the bolt 199 forming the pivotal support for the lever 198, the bolt 199 being entered in and mounted in the plate 196. Lever 198 carries on its upper end a guide pulley 200 and directly below the guide pulley 200 there is supported a frictional cleaner 201 through which the wire 183 passes before going over the pulley 200. The frictional cleaner 201 comprises a pair of plates 202 supported on the lever 198, one of the plates 202 being hingedly attached as at 203 to the lever 198 and the plates 202 having a clip 204 provided on the outer end to hold the plates against undue displacement from each other. The inner portions of the plates 202 are surfaced with felt or other suitable friction material, not shown, but operable to serve as a cleaning brush for the wire 183 as it passes on its way from the spool 173 and over the pulley 200 to the stator core 14 upon which the wire is being wound. As shown in Fig. 6 the lever 192 which is pivotally supported at 193 carries at its outer end a counter weight 205 supported on a bolt 206 which is adjustably positioned in an elongated aperture 307 provided in the lever 192 and the bolt 206 being equipped with a nut 206' so that the counter weight may be held in any adjusted position required on the outer end of lever 192. The counter weight 205 has the effect of pressing the outer end of the lever 192 downward and to the position shown in Fig. 6. The spool 173 is retained on the stem 144 by means of the spring clip 207 which engages in an annular recess, not shown, but provided in the outer end of stem 144.

As shown in Figs. 4 and 6 wire to be wound on the stator core 14 is lead from a spool in the position of the spool 173 and under a roller 208 supported on a pin 209 mounted in and extending from the lever 192, the roller 208 being maintained against dislodgement from pin 209 by virtue of a snap washer 210 engaged in an annular recess provided in the pin 209. The pivotally supported arm 198 may be swung to the right or to the position shown in Fig. 4, as required, so that wire may be wound on either the left or right-hand side of the stator core 14. In Fig. 4 the winding is proceeding on the left-hand side of the stator core 14 and the wire being fed on to the stator core 14 is coming from the spool 173. The spools 171 and 172 are not operated at this time to supply wire to the stator core 14 but are rotated around with the stator core 14 since ends of the wires 181, 182 leading from the spools 171 and 172 respectively already have portions wound on the stator core 14 and more portions of wires 181 and 182 have to be subsequently wound on the stator core 14 and it being necessary to maintain the wires 181 and 182 in unbroken condition until the full winding operation of the stator core 14 is completed. The extent of movements of the lever 198 is controlled by means of a lever toggle joint system 211, one movable member 212 of which operates between adjustable stop screws 213 and 214 mounted in internally threaded wing portions 215 and 216 respectively extending from the plate 196.

The half chuck portions 165 and 166 are provided with ring members 217 and 218 respectively which are secured in place on the half chuck portions 165 and 166 respectively by means of set screws 219. The ring members 217 and 218 are provided with internally threaded and diametrically disposed recesses 220 in which threaded end portions 191 of the stems 174 in the spool assemblies 171, 172 and 173 may be mounted as required when the spools are required to be carried around with the chuck 164 during portions of the winding operations. The spools 171, 172 or 173 may be mounted in either the left-hand portion 165 or the right-hand portion 166 of the chuck 164 as required depending on whether or not the instant winding application is being conducted on the left or the right side of the stator core 14. In Fig. 4 the spools 171 and 172 are on the right-hand portion of the chuck 164 since the instant point of winding application is on the left side of the stator core 14 supported between the chuck portions 165 and 166. It will be obvious that when the winding is being conducted on the right side of the stator core 14 the spools 171, 172 or 173 may be mounted in the ring member 217 in the left-hand portion 165 of the chuck 164. When the first portion of the first phase winding is being applied to the stator core 14 no spools of wire are carried around by the chuck 164, the spool of wire supplying the instant portion of the winding being mounted on the pin 144 extending from the lever 192. When the first portion of a winding has been applied the spool is removed from the pin 144 and is mounted on the chuck 164, another spool of wire may be mounted on the chuck diametrically opposite to the first spool to counterbalance the weight and mass of the first spool.

As shown in Fig. 4 a spindle 221 is provided to hold ends of wire coming from the spools carried around by the chuck 164. The spindle 221 comprises two parts as shown in Fig. 7. The lower part 222 has a reduced diameter and internally threaded upper portion 223 constructed and arranged to extend through the central opening 103 in the stator core 14. The internally threaded portion 224 of the portion 223 is dimensioned and threaded to receive the external threaded portion 225 on the upper part 226 of the two-part spindle 221. The shoulders 227 and 228 of the respective lower and upper parts 222 and 226 of the spindle 221 are arranged to engage upper and lower faces of the stator core 14 when the parts shown in Fig. 7 are brought together with the upper and lower parts 226 and 222 respectively of the two-part spindle 221 in screw threaded engagement to their full extent. The lower part 222 has a tapered end 229 terminating in an annular groove 230 producing a button like extreme lower end portion 231. The upper part 226 of the spindle 221 is tapered at 232 and terminates in a reduced end portion 233 in which an annular groove 234 is formed. The annular grooves 230 and 234 formed in the respective parts 222 and 226 of the two-part spindle 221 provide spaces in which ends of the wire coming from a spool may be anchored at the beginning of the winding operation, these initial ends being subsequently secured together in the star connection 125. Also portions of the wire may be snubbed in the grooves in the spindle 221 when the spool of wire is being carried by the chuck. When winding from the present resting spool is to be resumed the wire may be released from the end portion of the spindle. After the winding operations are completed outer ends of the windings are severed from their respective spools and are attached to insulated leadout wires, 235, 236 and 237 respectively, which are bound together with a suitable application of tape 238. Portions of the windings are lashed together at suitable points by pieces of fish line 239 or other suitable strong lashing material shown in Fig. 1.

To protect portions of the windings located in the grooves of the stator core 14 from becoming dislodged from their points of rest insulating strips 240 are slipped into place between the windings and the inner surfaces of the cross head portions 71 to 82 inclusive of the pole pieces 111 to 122 inclusive.

The order of winding may be changed as required as long as the first coil of every phase is wound before the second coil of any phase is wound. Likewise any third coil may be wound as long as all second coils have been wound. For example the winding sequence could be φA, φB, φC, φC, φB, φA etc. Also for example the winding sequence could be φB, φA, φC; φC, φB, φA; φA, φC, φB; φB, φA, φC; etc.

Although the invention has been shown and described as being applicable to the production of a stator involving three windings on a core it is obvious that the number of windings applied may be other than the number shown herein and the completed structure might be a rotor instead of a stator without departing from the spirit of the invention.

We claim:

1. An electromagnetic device comprising a cylindrical core of magnetic material, a plurality of pole portions projecting radially from said core, a plurality of energizing windings supported on said core, said windings being wound on said core in a series of stages and each winding having portions overlapping like portions of other of said windings, a lashing at the points of overlapping of said windings to lash the overlapping portions together, and leadout wires extending from said windings and beneath the overlapping portions of said windings and said lashing.

2. An electromagnetic device comprising a cylindrical core of magnetic material, a plurality of pole portions projecting radially from said core, a plurality of energizing windings supported on said core and extending around selected groups of said pole portions, each of said energizing windings being an unbroken length of wire, end loops of each of said energizing windings extending across end portions of said core and in overlapping relation with end loops of other of said energizing windings, a lashing binding said end loops of said energizing windings together at their points of overlapping, each of said energizing windings having portions alternately applied to said core with portions of other of said energizing windings, and leadout wires extending from said energizing windings and through said end loops of said energizing windings and beneath said lashings and emerging from the wound structure after passing beneath at least one of said lashings and serving as terminals for said electromagnetic device.

3. An electromagnetic device comprising a cylindrical core of magnetic material, a plurality of energizing windings supported on said core, end loops of said energizing windings extending across each other and across end portions of said cylindrical core, said end loops forming a network of wires at an end of the electromagnetic device, lashings of cord binding the end loops of said windings together at their mutual points of crossing and leadout wires extending from said energizing windings and through the network of said end loops of said energizing windings and through said lashings and emerging from the network of end loops after extending through at least one of said lashings of cord.

References Cited in the file of this patent

UNITED STATES PATENTS

| | | |
|---|---|---|
| 1,614,292 | Forbes | Jan. 11, 1927 |
| 1,619,415 | Gomory | Mar. 1, 1927 |
| 1,929,513 | Peele | Oct. 10, 1933 |
| 2,173,726 | Prindle | Sept. 19, 1939 |
| 2,328,497 | Romine | Aug. 31, 1943 |
| 2,381,750 | Hunsdorf | Aug. 7, 1945 |
| 2,406,704 | Mossay et al. | Aug. 27, 1946 |
| 2,465,820 | Sharrow et al. | Mar. 29, 1949 |
| 2,483,159 | Somerville | Sept. 27, 1949 |
| 2,502,068 | Anderson | Mar. 28, 1950 |
| 2,561,562 | Collins | July 24, 1951 |
| 2,611,930 | Hill et al. | Sept. 30, 1952 |
| 2,632,603 | Hunsdorf | Mar. 24, 1953 |
| 2,647,696 | Brunand | Aug. 4, 1953 |
| 2,749,456 | Luenberger | June 5, 1956 |